United States Patent
Rowe et al.

(10) Patent No.: US 6,225,726 B1
(45) Date of Patent: May 1, 2001

(54) APPARATUS AND METHOD FOR CLAMPING TURBINE GENERATOR COIL WINDINGS

(75) Inventors: Charles M. Rowe, Orlando; Alex Christodoulou, Oviedo; Thorsten Weltzien, Orlando, all of FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 0 days.

(21) Appl. No.: 09/559,014

(22) Filed: Apr. 24, 2000

Related U.S. Application Data

(60) Division of application No. 09/260,777, filed on Mar. 2, 1999, now Pat. No. 6,054,792, which is a continuation-in-part of application No. 09/013,174, filed on Jan. 26, 1998, now Pat. No. 5,939,814.

(51) Int. Cl.[7] ............................. H02K 3/46; H01F 7/06
(52) U.S. Cl. ............................................. 310/260; 29/605
(58) Field of Search .......................... 29/605; 310/260, 310/270, 271, 214, 45, 71

(56) References Cited

U.S. PATENT DOCUMENTS

| | | | |
|---|---|---|---|
| 3,691,416 | 9/1972 | Drexler et al. | 310/260 |
| 3,866,073 | 2/1975 | Gjaja | 310/260 |
| 3,949,257 | 4/1976 | Cooper et al. | 310/260 |
| 3,974,409 | 8/1976 | Loy | 310/260 |
| 3,988,625 | 10/1976 | Jager et al. | 310/260 |
| 3,991,334 | 11/1976 | Cooper et al. | 310/260 |
| 4,016,443 | 4/1977 | Johnson | 310/260 |
| 4,088,913 | 5/1978 | Prigorovsky et al. | 310/260 |
| 4,563,607 | 1/1986 | Cooper et al. | 310/260 |
| 4,618,795 | 10/1986 | Cooper et al. | 310/260 |
| 4,782,579 | 11/1988 | Rowe et al. | 29/596 |
| 4,950,934 | 8/1990 | Holly, III | 310/260 |
| 5,373,211 | 12/1994 | Ramirez-Coronel et al. | 310/260 |
| 5,734,220 | 3/1998 | Rowe et al. | 310/260 |
| 5,939,814 | 8/1999 | Rowe et al. | 310/260 |
| 6,054,792 * | 4/2000 | Rowe et al. | 310/260 |

* cited by examiner

Primary Examiner—Nestor Ramirez
Assistant Examiner—Dang Dinh Le

(57) ABSTRACT

An apparatus useful in clamping stator coil windings of a turbine generator includes a retaining platform for extending across a pair of the coil windings positioned in a spaced relation. The retaining platform includes a bore extending therethrough. A connecting insert member is slidably carried within the bore and has a through-hole with separable mating segments for admitting a rod into the through-hole. An elongated rod passes through the throughhole of the connecting insert member, which rod includes a bulbous shaped end dimensioned for passing through the bore of the retaining platform but cannot pass through the through-hole of the connecting insert member. Thus providing tension in the elongated rod biases the platform against the pair of coil windings.

13 Claims, 13 Drawing Sheets

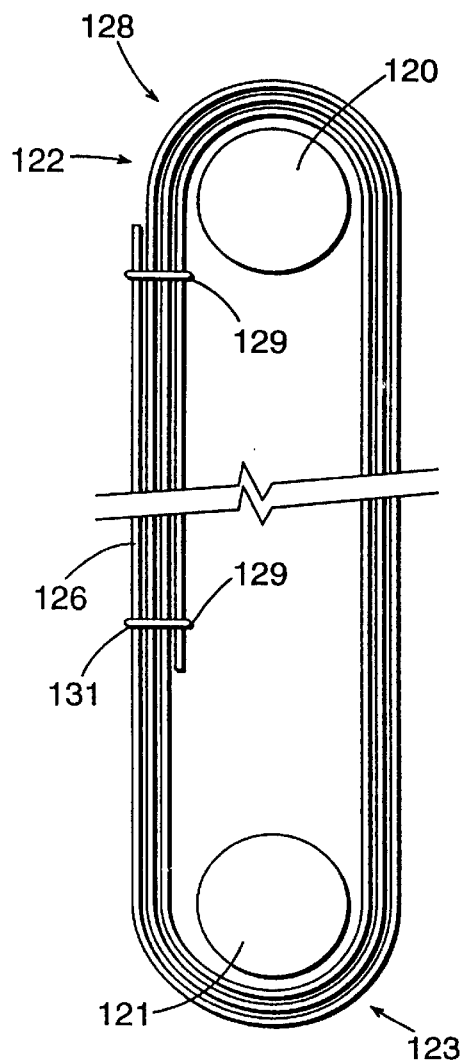
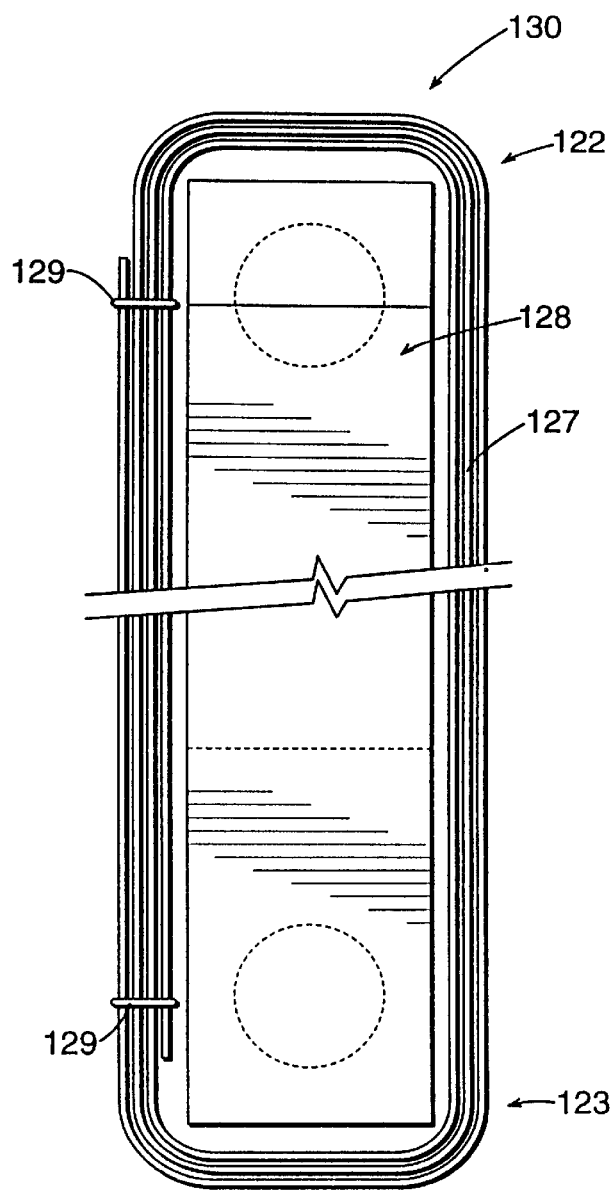
FIG. 9.
FIG. 9A.

APPARATUS AND METHOD FOR CLAMPING TURBINE GENERATOR COIL WINDINGS

CROSS REFERENCE TO RELATED APPLICATION

This application is a division of co-pending U.S. patent application Ser. No. 09/260,777 filed on Mar. 2, 1999, now U.S. Pat. No. 6,054,792 the disclosures of which are hereby incorporated by reference in their entirety. This application is a continuation-in-part application of application Ser. No. 09/013,174 for Clamping Apparatus For Turbine Generator Coil Windings, filed on Jan. 26, 1998, now U.S. Pat. No. 5,939,814 commonly owned with the present invention.

FIELD OF THE INVENTION

The present invention relates to turbine generators and more particularly to a clamping apparatus for clamping of stator coil windings within a turbine generator.

BACKGROUND OF THE INVENTION

Turbine generators for producing electric power are well known and typically include an end winding portion that includes a stator core having several slots that receive and support conductors. The end windings may not be adequately supported within the core slots during operation of the generator and are often subject to severe vibrations and stresses which may cause adverse structural deformations. Structural deformation may also arise from electromagnetic forces which occur during abnormal short-circuit or fault conditions.

Several techniques have been developed in an attempt to prevent the end windings from undergoing negative structural deformations, such as that disclosed in U.S. Pat. No. 4,563,607 to Cooper et al. for a radial clamp assembly for dynamoelectric machine stator coil end turns. Top and bottom coils disposed within slots stator iron core are supported with a radial clamp, braces, brackets, rings, and strain blocks. The radial clamp Is typically positioned in the mid-involute region between the axial extreme of the end winding and the core.

The support blocks are located radially above and below a respective pair of end turns so that one support block bears against two parallel bottom coils and the other support block bears against two parallel top coils.

Upper and lower pins are disposed across the support block transverse to the orientation direction of the coils. A tensioned banding loop disposed continuously around the pins on each side of the coils so that the banding loop bears against the pins which, in turn, bear against their adjacent support blocks and coils.

With the banding loop in position, the pins are rotated to twist the banding loop for taking in excess slack, thereby, tightening the banding loop between the coils. Resin dispersed within the banding loop is then cured on site, typically by hot air flowing over the banding loop. The curing process requires additional time and expense to install. Typically, band curing extends work schedules, and consequently adds to the overall cost of the turbine generator. It would, therefore, be desirable to provide a more economical means of installing and maintaining a turbine generator. In addition, it would be desirable to reduce the number of components that must be accounted for during the installation of the radial clamps.

SUMMARY OF THE INVENTION

In view of the foregoing background, it is therefore an object of te present invention to provide an apparatus and related method for clamping coil windings using precured radial bands or the like. It is further an object of the present invention to reduce the components and processing steps typically used in clamping the stator coils of typical dynamo electric machines.

These and other objects, advantages and features of the present invention are provided by a clamping apparatus comprising a retaining platform for extending across a pair of coil windings positioned in a spaced relation, wherein the retaining platform has a bore extending therethrough. A connecting insert member is slidably carried within the bore of the retaining platform. The connecting insert member has a through-hole and means for admitting a rod into the through-hole. An elongated rod passes through the through-hole of the connecting insert member and includes a bulbous shaped end dimensioned for passing through the bore of the retaining platform while the through-hole of the connecting insert member prevents passage of the bulbous shaped end. therethrough. Thus, tension in the elongated rod biases the platform against the coil windings.

In one preferred embodiment, the connecting insert member comprises separable mating segments as the means for admitting a rod into the through-hole, and the through-hole of the connecting insert member includes a first dimension that permits passage of the bulbous end therein and a second dimension which prevents passage of the bulbous end therethrough. Further, one embodiment of the connecting insert member has a tapered cross-section for slidably securing within the bore of the retaining platform.

In a preferred embodiment, the elongated rod is formed from a precured and pretensioned banding material. A method aspect of the present invention includes forming the elongated rod by wrapping a band a multiplicity of times for forming a continuous loop, positioning first and second balls in a spaced relation within the loop, twisting the loop about an axis extending between the balls, and continuing the twisting until the balls are fully engulfed within the band to form a bulbous shape at each end. Further, a fiberglass tape impregnated and bonded with a resin is provided. Once the elongated rod is formed from the fiberglass tape, the twisted loop containing the balls is tensioned and the resin cured for forming a precured rigid elongated rod.

BRIEF DESCRIPTION OF THE INVENTION

A preferred embodiment of the invention, as well as alternate embodiments are described by way of example with reference to the accompanying drawings in which.

Figure 3:
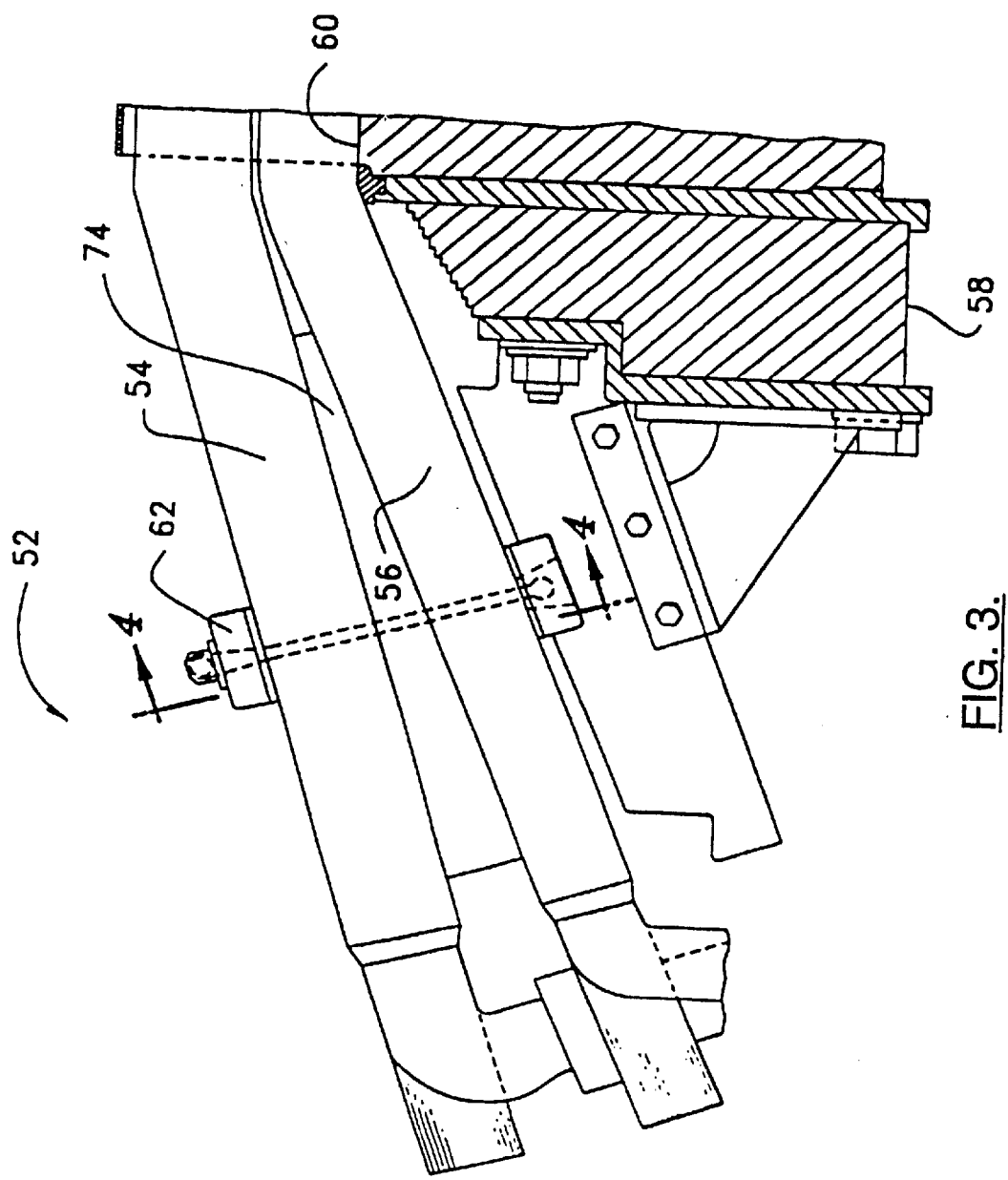
FIG. 3 illustrates a radial clamp in accordance with the preferred embodiment of the present invention that may be employed in a dynamo-electric machine.
Figure 4:
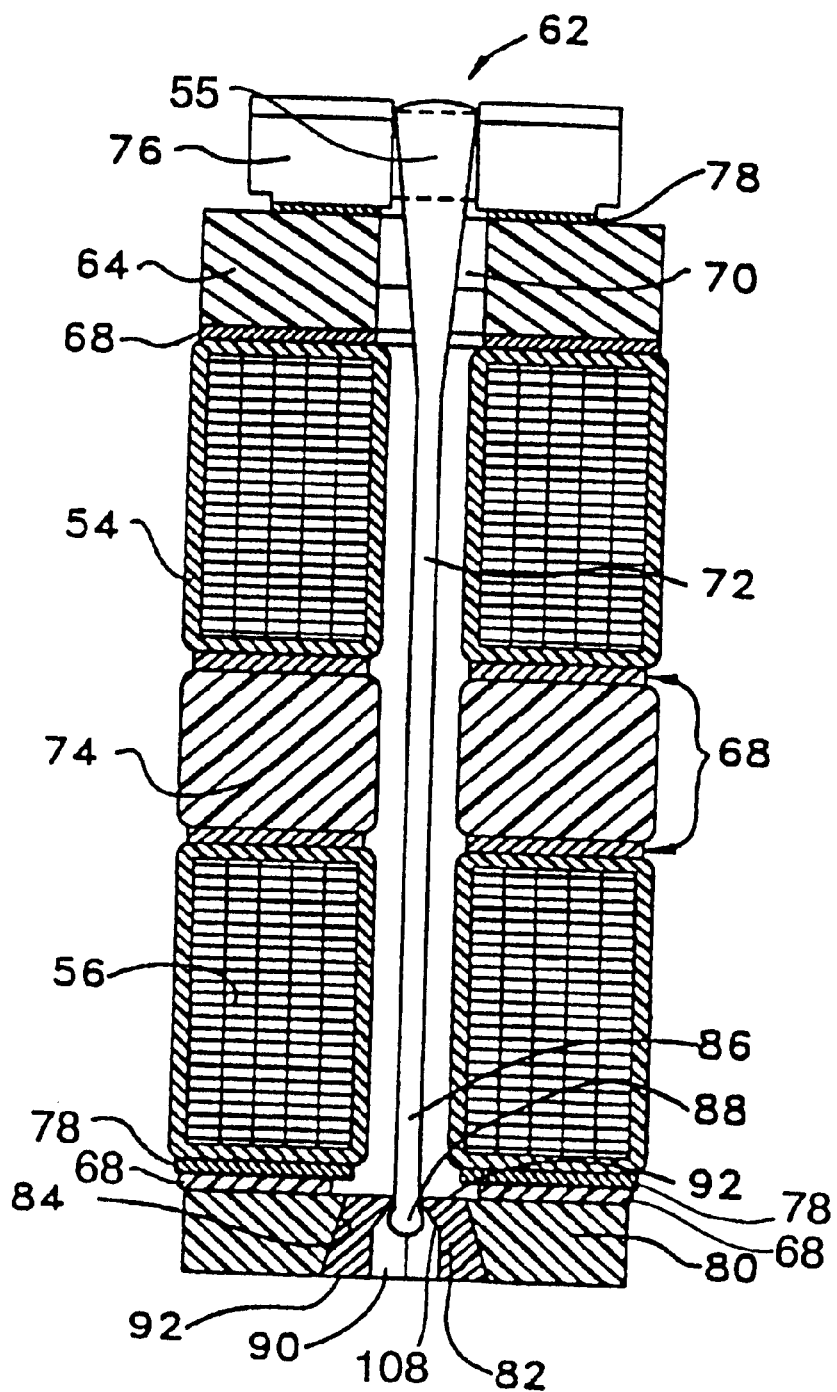
FIG. 4 is a sectional view taken along section line 4—4 of the dynamo-electric machine shown in FIG. 3.
Figure 4A:
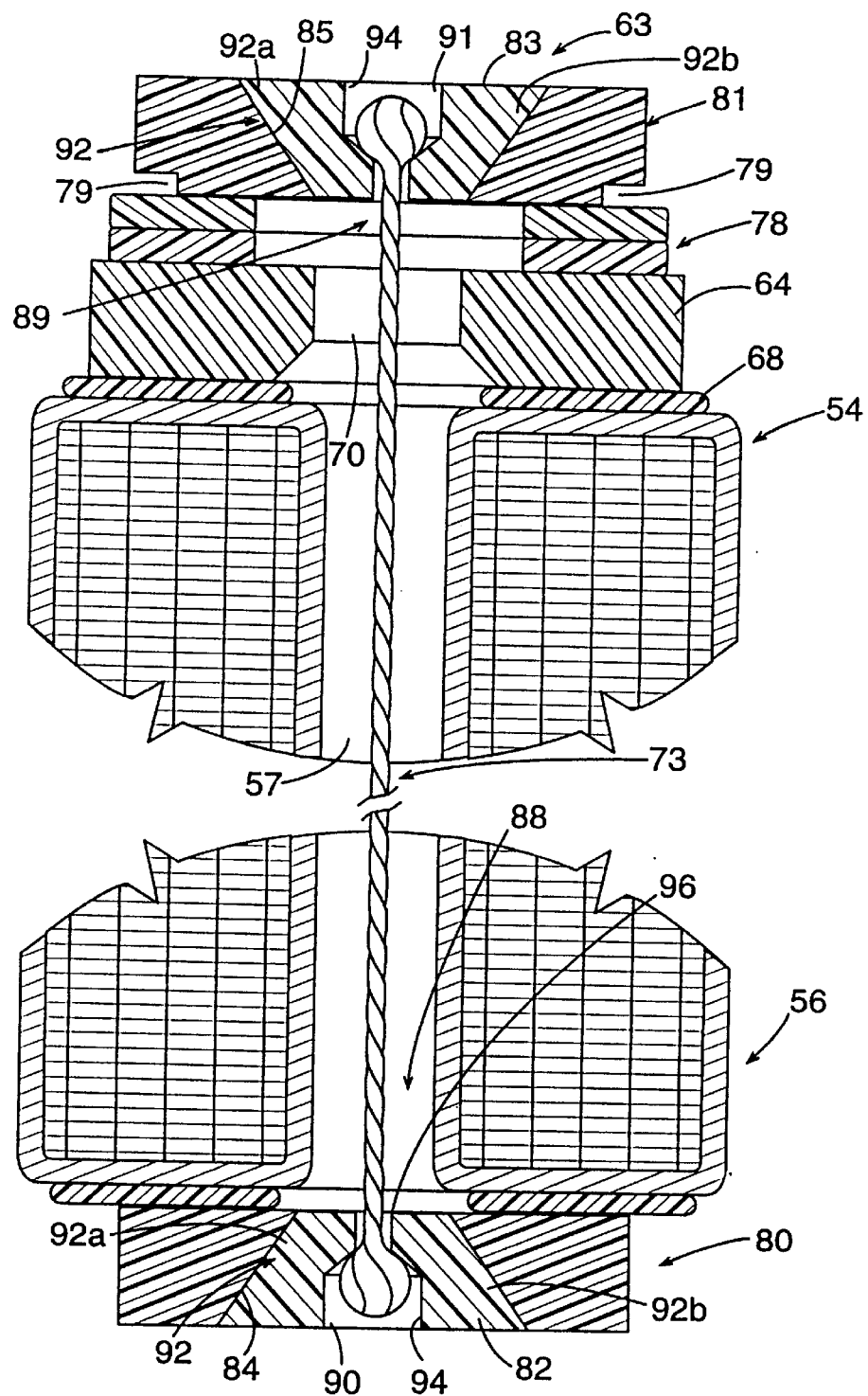
FIG. 4A is a sectional view of the dynamo-electric machine illustrating an alternate clamping apparatus embodiment of the present invention including.
Figure 4B:
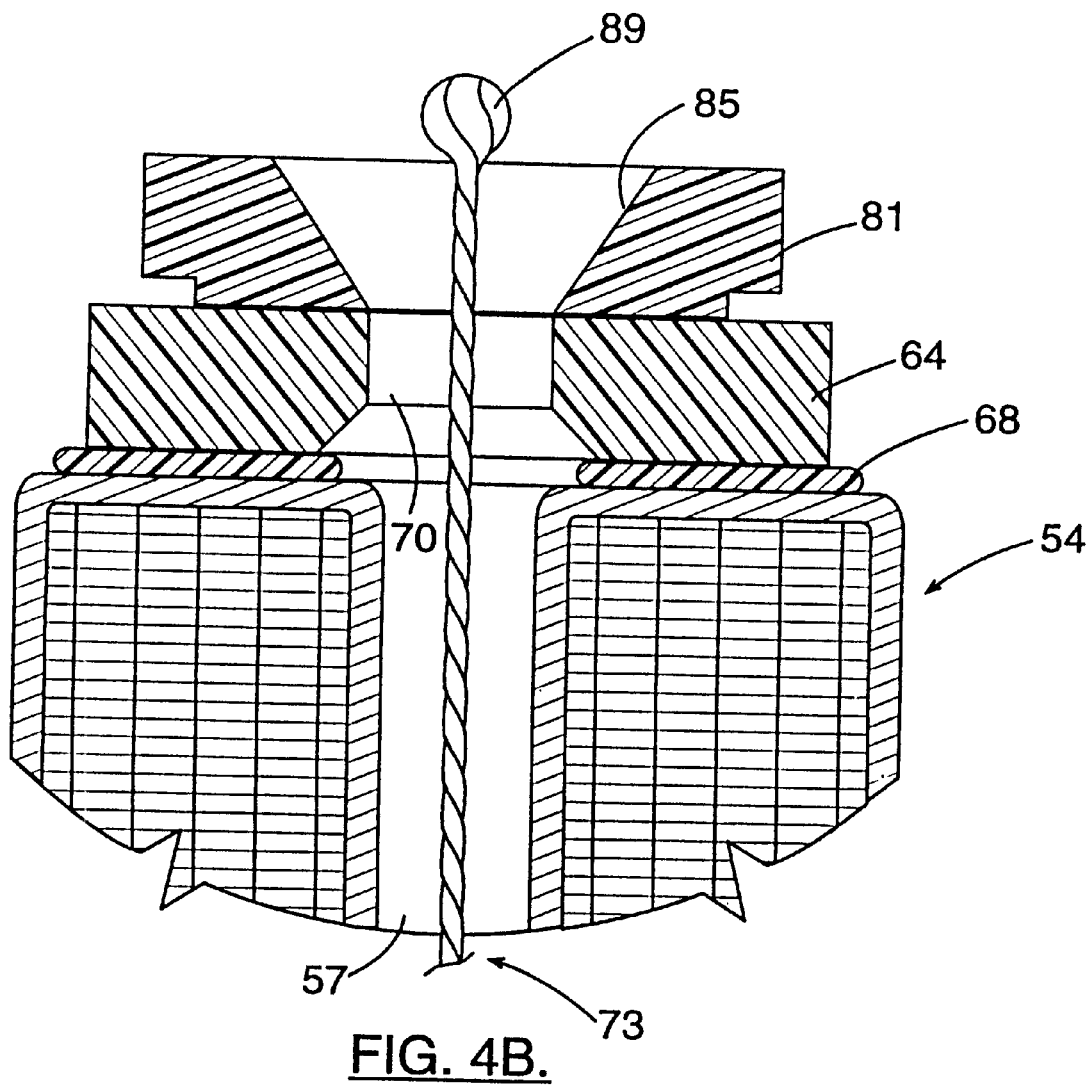
Figure 5:
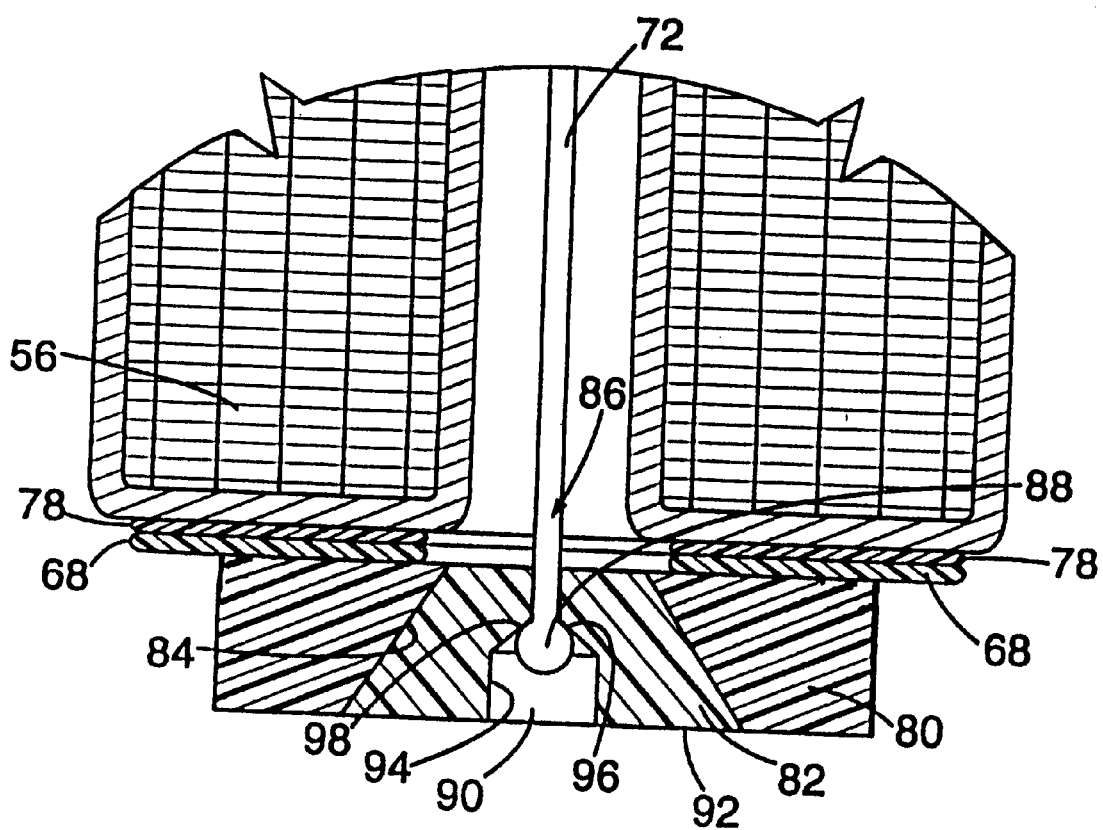
Figure 6:
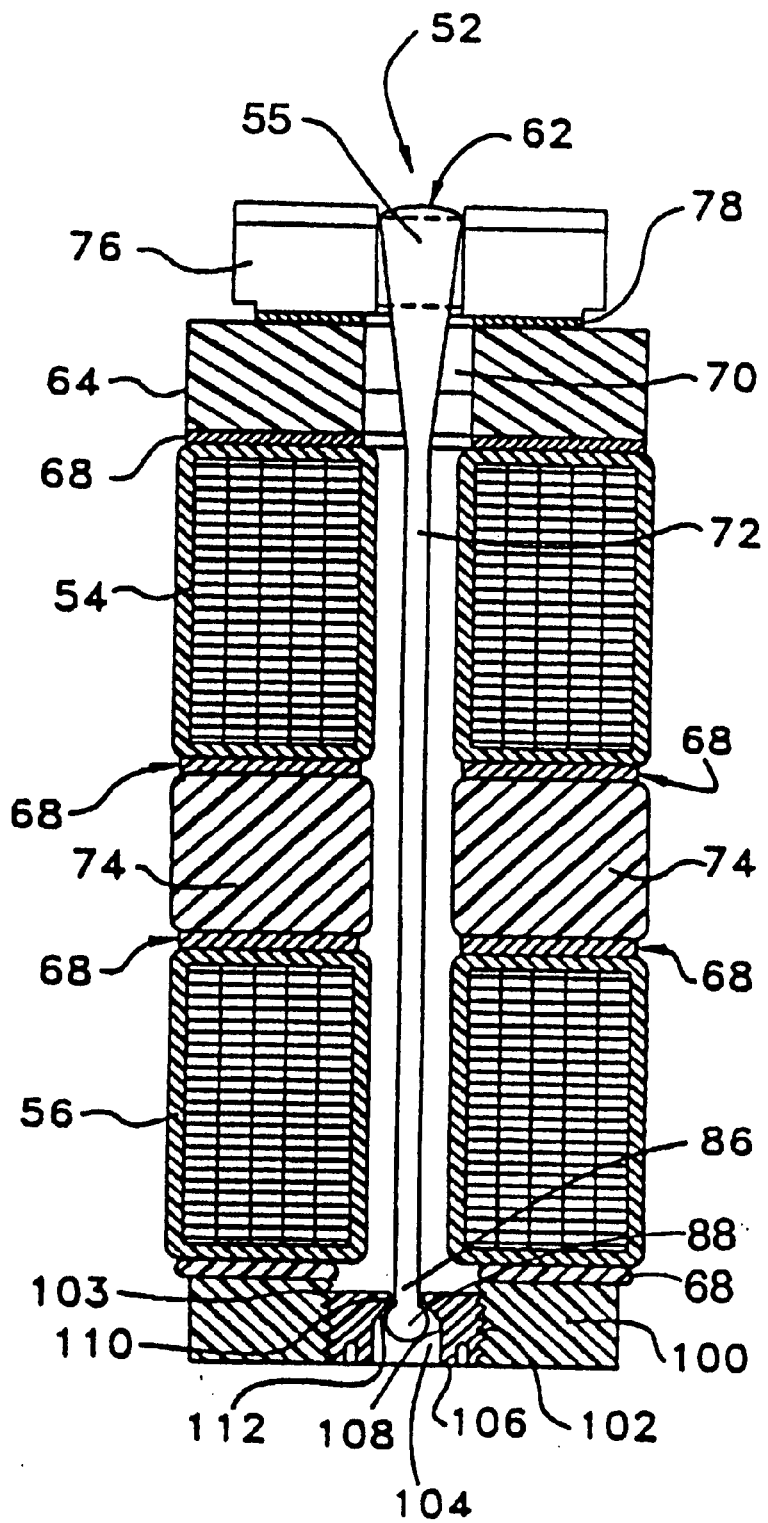
Figure 7:
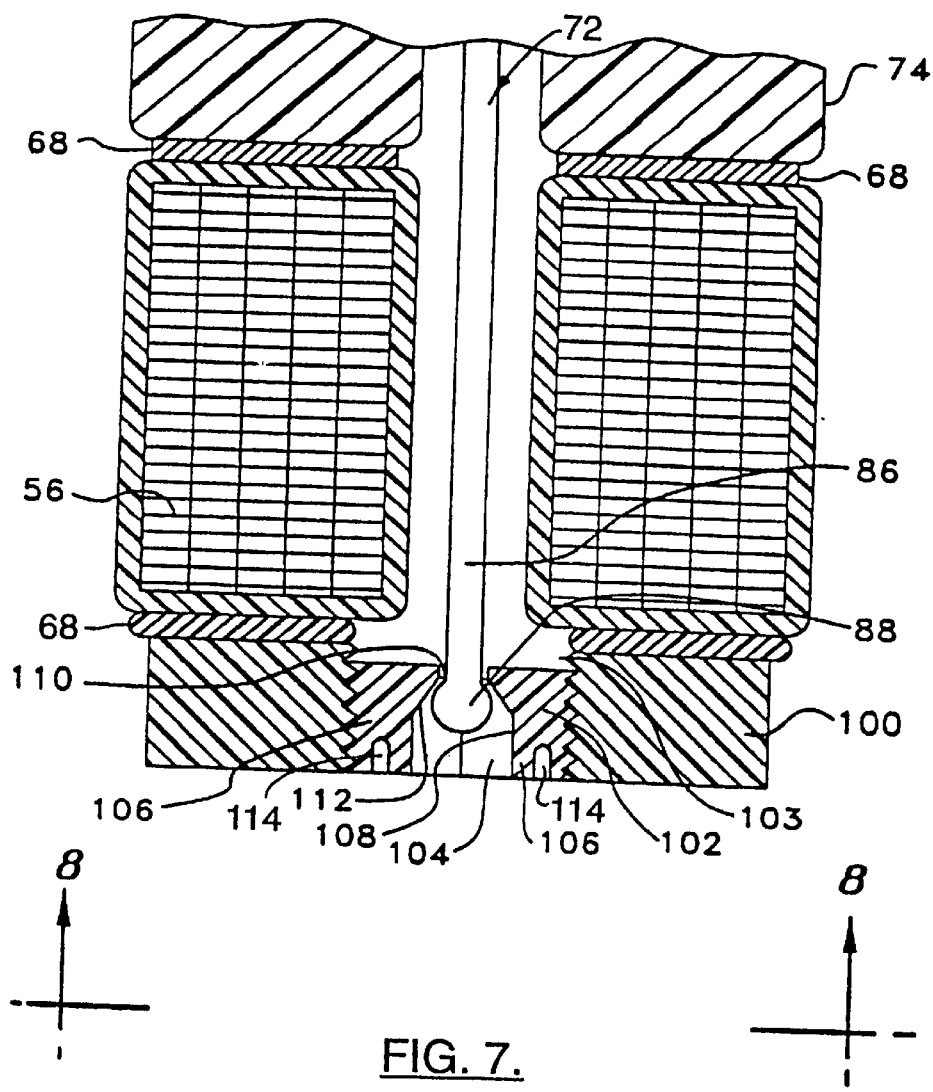
Figure 8:
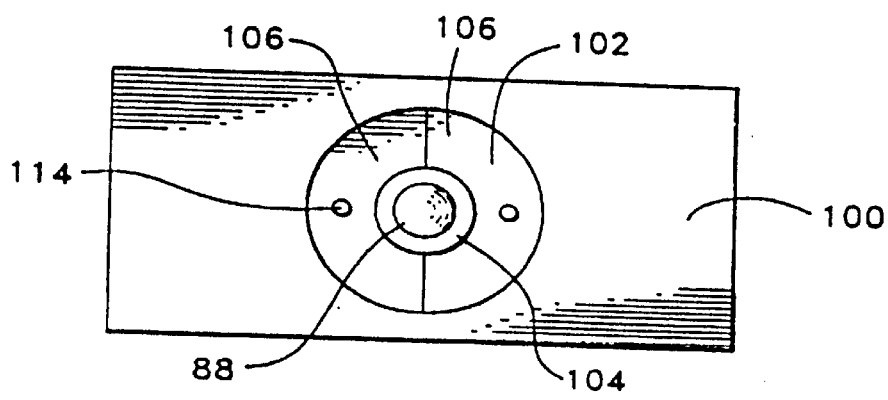
Figure 10:
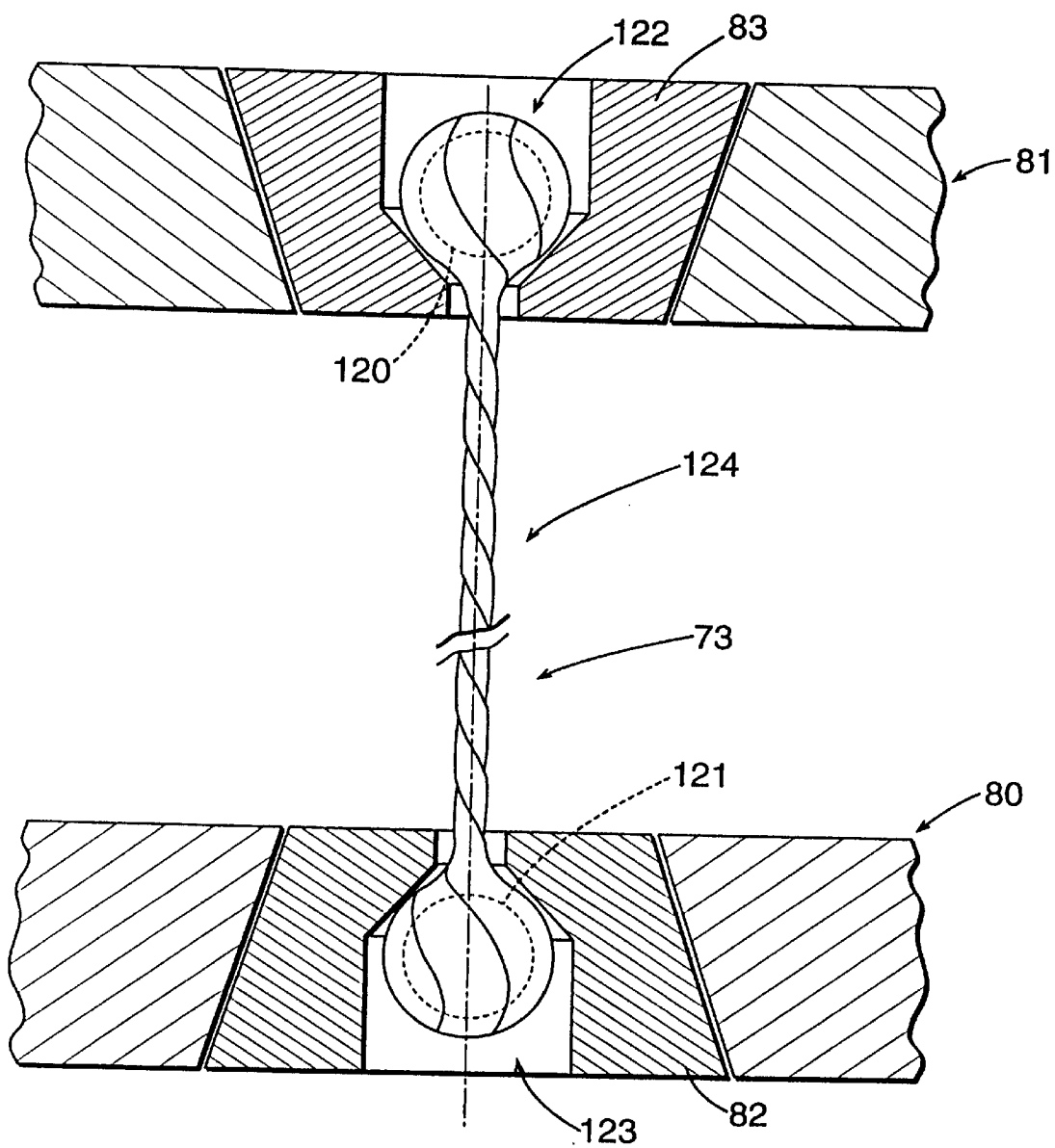
Figure 11:
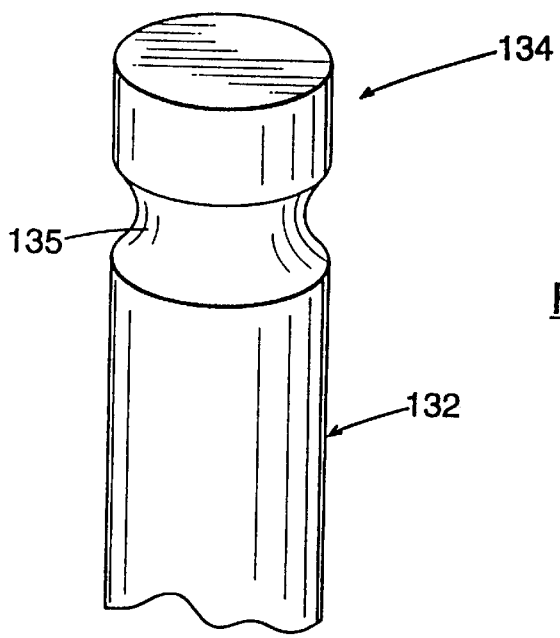

FIG. 4B and are partial cross-sectional views of one embodiment of the present invention illustrating phases of clamping apparatus installation, by way of example;

FIG. 5 is an enlarged view of a band mount assembly that is employed with the radial clamp shown in FIG. 3;

FIG. 6 illustrates a second embodiment of a radial clamp in accordance with the present invention;

FIG. 7 is an enlarged view of a band mount assembly that is employed with the radial clamp shown in FIG. 6;

FIG. 8 is a bottom view of the band mount assembly shown in FIG. 7;

FIG. 9 is a side view illustrating a loop formed around two balls in preparation of forming an elongated rod described with reference to FIG. 4A;

FIG. 9A a side view illustrating an alternate embodiment of FIG. 9 with a double loop formed around two balls in preparation of forming an elongated rod described with reference to FIG. 4A;

FIG. 10 is a partial cross-sectional view detailing the elongated rod illustrated with reference to FIG. 4A;

FIG. 11 is an alternate embodiment of an elongated rod end portion; and

Figure 12:
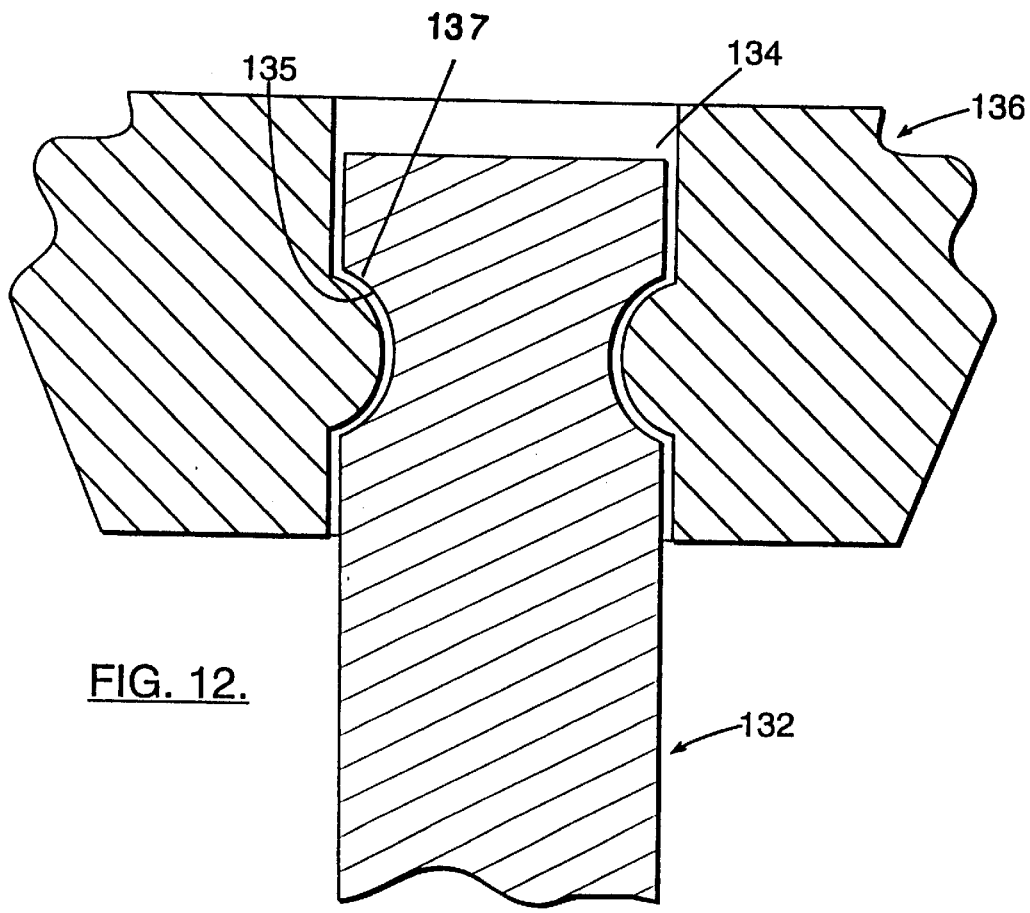

FIG. 12 is a cross-sectional view illustrating use of the rod of FIG. 11 within a connecting insert member of a platform.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
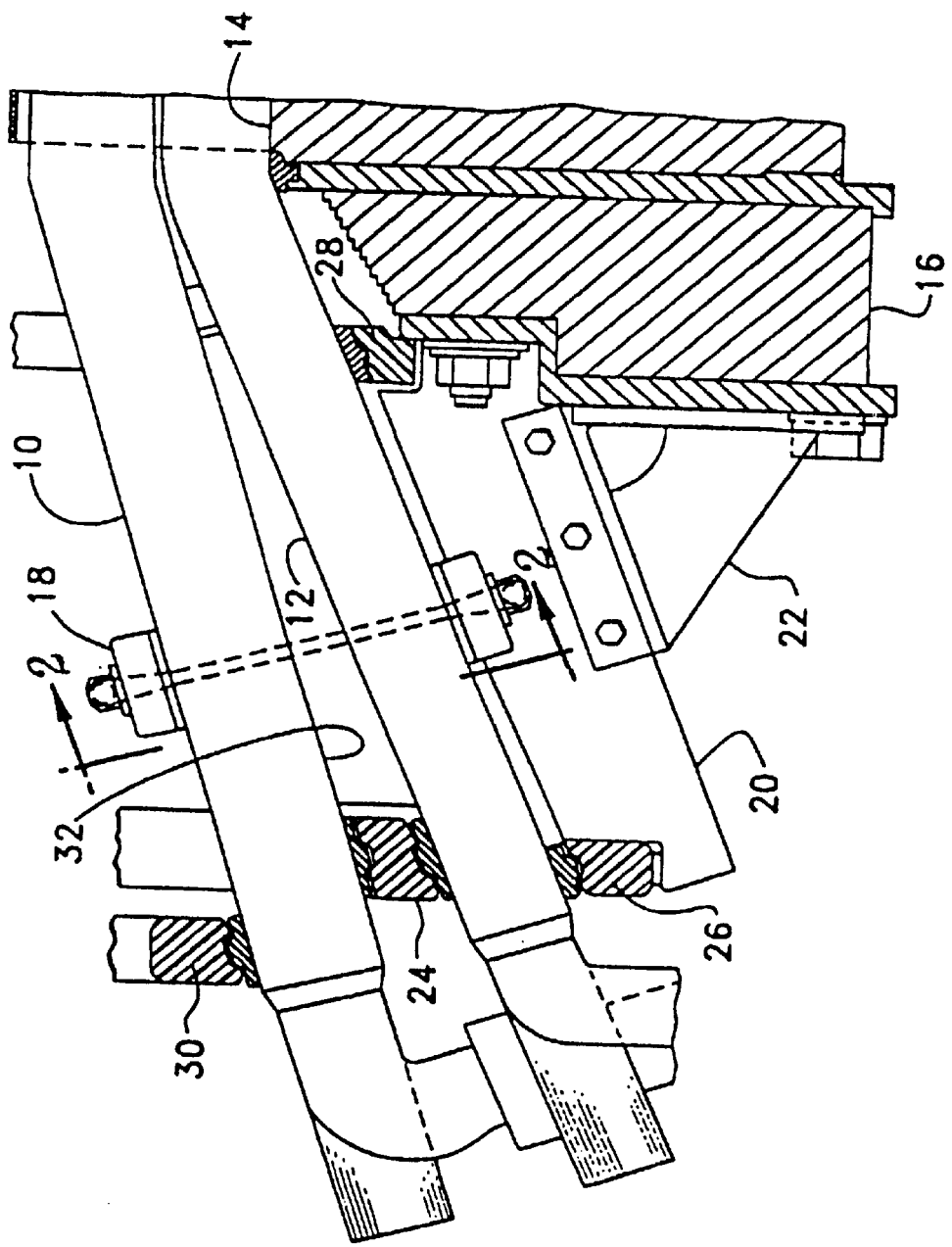
FIG. 1 illustrates a prior art radial clamp assembly that is employed in a dynamo-electric machine.

As described earlier with reference to U.S. Pat. No. 4,563,607 to Cooper et al. and assigned to the assignee of the present invention, improvements to techniques currently used are needed. A brief description of one technique known in the art will aid the reader in appreciating the improvements provided with the present invention. With reference first to FIG. 1, a top coil 10 and bottom coil 12 are disposed within slots 14 of stator iron core 16. The coils 10 and 12 are supported with a radial clamp 18, braces 20, brackets 22, rings 24, 26, 28, 30, and strain blocks 32. The radial clamp 18 is typically positioned in the mid-involute region between the axial extreme of the end winding and the core.

Figure 2:
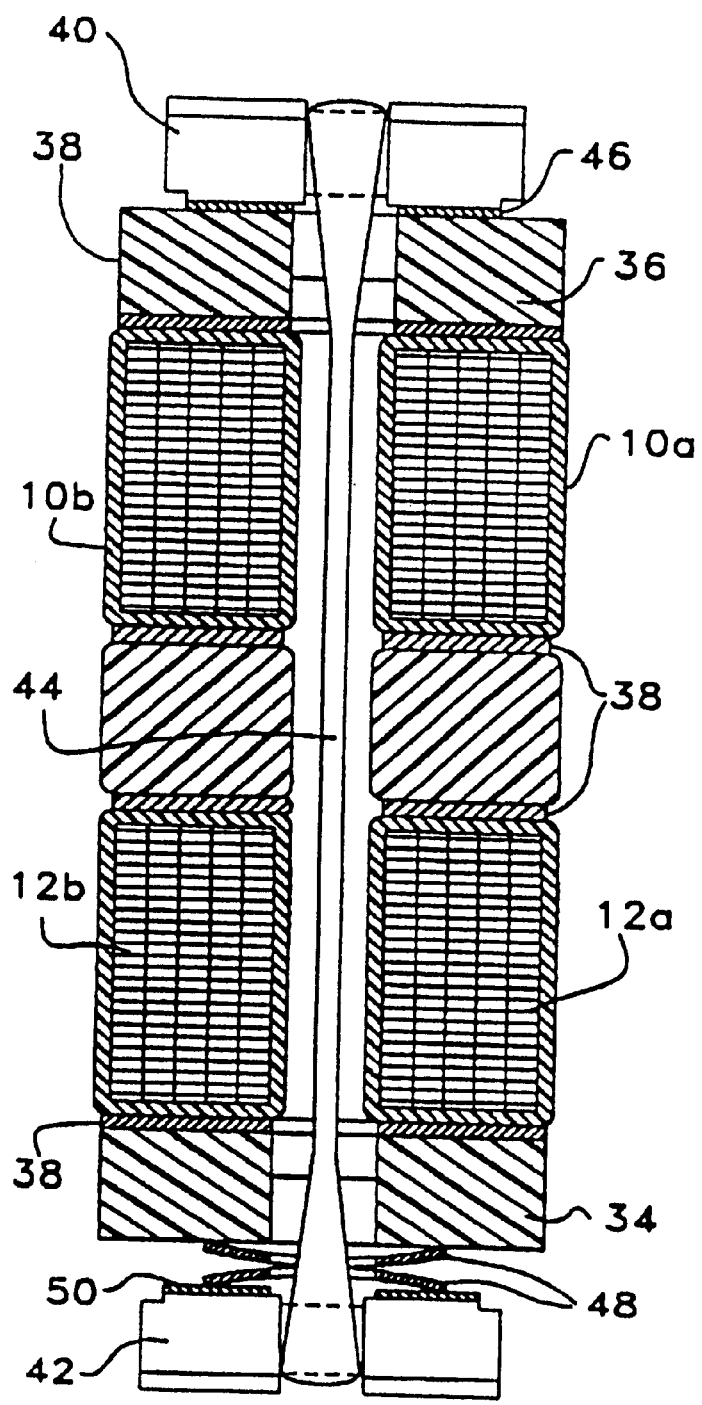
FIG. 2 is a sectional view taken along section line 2—2 of the dynamo-electric machine shown in FIG. 1.

As illustrated with reference to FIG. 2, the support blocks 34 and 36 are located radially above and below a respective pair of end turns so that one support block 34 bears against two bottom coils 12a and 12b and the other support block 36 bears against two top coils 10a and 10b. Each one of the support blocks 34 and 36 is spaced from an adjacent coil by a layer 38 of conformable material. An upper pin 40 is disposed across support block 36 transverse to the direction in which the coils run and a relative lower pin 42 is similarly disposed across support block 34. A tensioned banding loop 44 is disposed in a continuous loop around the pins 40 and 42 on each side of the coils so that the banding loop 44 bears against the pins which, in turn, bear against their adjacent support blocks and coils. A shim 46 is disposed between the pin 40 and the support block 36. Spring members 48 and support washers 50 are disposed between the lower pin 42 and support block 34.

As earlier described, and with reference again to FIG. 2, the pins 40 and 42 are adapted to turn and twist the banding loop 44 to take in excess slack in the banding loop, thereby, tightening the banding loop 44 between the coils 10 and 12. Resin dispersed within the banding loop 44 is then cured, typically by hot air flowing over the banding loop. After the banding loop 44 is positioned and cured, a device, such as a hydraulic jack, is used to pull at least one of the pins radially away from the coils, thereby, stretching and inducing a tension on the banding loop 44. Subsequently, the shims 46 are placed between the upper pin 40 and support block 36 so that the banding loop 44 remains in tension upon the release of the hydraulic jack.

Referring now to FIG. 3, one preferred embodiment of the present invention includes a preload system 52 for preloading a top or first coil end winding 54 and a bottom or second coil winding 56 of a stator iron core 58 is shown. The top coil 54 and bottom coil 56 are disposed within slots 60 defined by the stator iron core 58: The coils 54 and 56 are secured by a clamping apparatus, the clamping apparatus 62 in accordance with the present invention. With regard to the present invention, it is to be understood that use of terms such as upper, lower, top, bottom, and the like, by way of example, are relative terms and the structures and methods of the present invention are not limited by the convenient use of such relative terms.

As illustrated with reference to FIG. 4, one embodiment of the clamping apparatus 62 includes a top support block 64 which is positioned radially outside a respective pair of top coils 54. Preferably, bottom support blocks are not required as the prior art typically requires. The top support block 64 is spaced from an adjacent coil by a layer 68 of conformable material, such as polyester felt. The support block compresses the top coil 54 in an operating position. More particularly, the top support block 64 includes an aperture 70 which is adapted to receive an elongated rod herein initially referred to as a precured radial band 72 in accordance with the present invention therethrough to secure the coils 54 and 56 in an operating position. Preferably, the aperture 70 is substantially radially aligned in relation to the axis of the machine, a horizontal line in FIGS. 1 and 3. The support block 64 is made of materials that are typically non-conducting and non-magnetic, by way of example. The radial band 72 passes through the support block aperture 70. Strain blocks 74 may be positioned at various locations to provide support between the top coils 54 and bottom coils 56. The employment of strain blocks 74 is well known to those having ordinary skill in the art.

With reference again to FIG. 4, in one embodiment of the present invention the clamping apparatus 62 comprises an upper pin 76, the precured radial band 72, retaining platform 80, and connecting insert member 82 which is adapted to adjustably mate within the retaining platform. The upper pin 76 is adapted to be disposed across the top support block 64 transverse to the direction in which the top coil runs. A shim 78 is disposed between the upper pin 76 and the support block 64. The upper pin 76 preferably comprises a fiberglass material impregnated with an epoxy resin.

The precured radial band 72 has a first end 55 and a second end 86 which has a head portion 88 having a bulbous shape integrally formed thereon. The first end 55 of the radial band 72 is looped, and preferably formed, around the transversely placed upper pin 76 such that the second end 86 of the banding loop 72 can extend through the aperture 70 of the top support block 64. Preferably, the head portion 88 has a generally spherical shape of a size to enable the band 72 to be installed in existing windings. In is intended that the bulbous shaped head portion has a smaller girth than the looped first end 55.

As illustrated with reference to FIG. 5, the retaining platform 80 defines a bore 84 which has a substantially tapered cross-section. The bore 84 is adapted to adjustably receive the connecting insert member 82 which has a similar tapered cross-section as the bore 84. The connecting insert member 82 defines a through-hole 90 which is adapted to receive the bulbous shaped head portion 88 therein. The retaining platform is adapted to be positioned proximate the bottom coils 56. The connecting insert member 82 is adapted to be disassembled such that the head portion 88 can be easily received within the through-hole 90. Preferably, the connecting insert member 82 has two mating halves 92 which define the through-hole 90. The through-hole 90 has a first relatively large diameter portion 94 and a second relatively small diameter portion 96. Preferably, the first and second diameter portions 94, 96 are coaxial. A shoulder portion 98 is positioned between the first and second diameter portions 94, 96. The two-halves 92 of the connecting insert member 82 are adapted to be disassembled such that the bulbous head portion 88 of the elongated rod, the precured radial band 72 can be received in each half of the large diameter portion 94. In this arrangement, the bulbous head portion 88 of the banding loop 72 is maintained within the large diameter portion 94 and against the shoulder portion 98 with the remaining portion of the precured radial band 72 extending through the small diameter portion 96 towards the pin 76. Subsequently, the connecting insert member 82 is placed within the bore 84 such that the connecting insert member 82 anchors the head portion 88 of the radial band 72. Additionally, the head portion 88 is adapted to slightly rotate to adjust and align the band.

As illustrated with reference to FIG. 4A, another preferred embodiment of the present invention, a clamping apparatus 63 comprises a support block 64 positioned radially outside a top pair of parallel coil windings 54 positioned in a spaced relation and thus having a gap 57 therebetween. The support block 64 has an aperture 70 therethrough, the aperture 70 being aligned with the gap 57 between the top pair of coil windings 54, as earlier described with reference to FIG. 4. A top retaining platform 81 is positioned adjacent the support block 64 on a side opposing the top pair of coil windings 54 and extending thereacross. The reader is reminded that the use of such relative terms as top and bottom are presented herein for convenience in describing preferred embodiments of the present invention and that such words are generally interchangeable. The retaining platform 81 has a bore 85 extending therethrough and generally aligned with the aperture 70. As described earlier with reference to FIG. 4, and here with reference to FIG. 4A, the bottom retaining platform 80 extends across the lower pair of parallel coil windings 56 positioned in a spaced relation thus having a gap 57 therebetween, and further in spaced relation with the top pair of coil windings 54. The bottom retaining platform 80 has the bore 84 extending therethrough. As a result, the top and bottom pairs of coil windings 54, 56 are sandwiched between the top and bottom retaining platforms 81, 80.

Continuing with reference to FIG. 4A, bottom and top connecting insert members 82, 83 are slidably carried within each bore 84, 85 respectively for the retaining platforms 80, 81. The connecting insert members 82, 83, each have a through-hole 90, 91 and means for admitting an elongated rod 73 into the through hole 90, 91. The rigid elongated rod 73 passes through the through-holes 90, 91 of the connecting insert members 82, 83. In this preferred embodiment, the elongated rod 72 has both ends as bulbous shaped ends 88, 89 dimensioned for passing through each bore 84, 85 of the retaining platforms 80, 81 while the through-holes 90, 91 of the connecting insert members 82, 83 respectively prevent passage of the bulbous shaped ends 88, 89 therethrough.

Thus tension in the elongated rod 73 biases the top and bottom retaining platforms 80, 81 against the coil windings 54, 56 in a clamping arrangement thereof.

In a similar manner as described earlier with reference to FIGS. 4 and 5, each of said through-holes 90, 91 of the connecting insert members 82, 83 includes a first dimension 94 that permits passage of the bulbous ends 88, 89 therein and a second dimension 96 which prevents passage of the bulbous ends 88, 89 therethrough. As further illustrated with reference to FIG. 4A, the connecting insert members 82, 83 have a tapered cross-section that is adapted to be secured within the bore 84, 85 of the retaining platforms 80, 81 for adjusting a tension on said elongated rod 73 using the platform 81. Again, each of the connecting insert members 82, 83 comprises separable mating segments 92, wherein the separable mating segments 92 comprise two mating arcuate portions 92a, 92b defining the through-holes 90, 91.

Another embodiment of a retaining platform 100 and connecting insert member 102 is illustrated with reference to FIGS. 6–8. The retaining platform 100 defines a bore 103 which is preferably radially positioned in relation to the axis of the machine. The bore 103 is threaded to adjustably mate with the connecting insert member 102 which defines a through-hole 104. The connecting insert member 102 is adapted for disassembly such that the bulbous shaped head portion 88 can be received within the through-hole 104. Preferably, the connecting insert member 102 has two identical mating halves 106 which define the through-hole 104. The through-hole 104 has a first relatively large diameter portion 108 and a second relatively small diameter portion 110. Preferably, the first and second diameter portions are coaxial. A shoulder portion 112 is positioned between the first and second diameter portions 108 and 110. The connecting insert member is threaded within the retaining platform bore. Preferably, the retaining platform and connecting member are made of the same material that is employed to make the pin 76.

In this arrangement, the head portion 88 is maintained within the large diameter portion 108 and against the shoulder portion 112 with the remaining portion of the band 72 extending through the small diameter portion 110 towards the pin 76. With the head portion 88 maintained, the connecting insert 102 is threaded within the retaining platform bore 103 to achieve the desired band length. In this arrangement, the head portion 88 is adapted to slightly rotate to adjust and align the radial band. As illustrated with reference again to FIG. 8, two adjusting holes 114 are adapted to receive an adjusting tool to accommodate varying band lengths.

In operation, and by way of example, the precured radial band 72 described with reference to FIGS. 4 and 6, is preformed around the pin 76. The pin 76 is positioned against the top support block 64 with the second end 86 of the banding loop 72 extending through the support block aperture 70. The head portion 88 of the banding loop 72 is positioned in each half 92 of the connecting insert member 102, thereby, securing the head portion 88 against the shoulder portion 112 and within the large diameter portion 108 with the remaining portion of the banding loop 72 extending through the small diameter portion 110 towards the pin 76. In this arrangement, the connecting insert member 102 is placed within the bore 103 of the platform 100 such that the connecting insert member 102 anchors the head portion 88 of the banding loop 72. Additionally, the head portion 88 is adapted to slightly rotate to adjust and align the band.

Figure 4C:
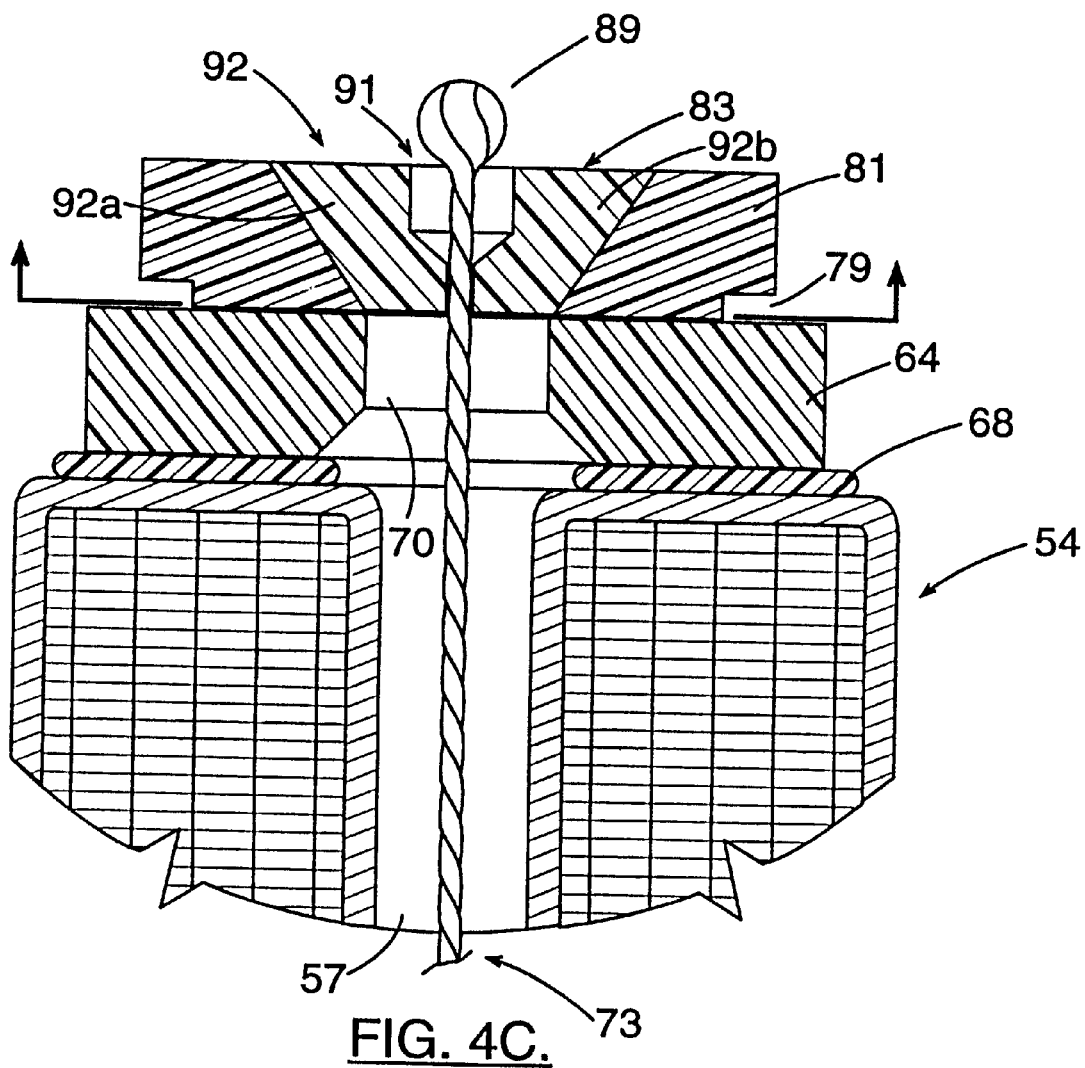

By way of further example, and with reference to FIGS. 4B and 4C, installation of the clamping apparatus 63 earlier described with reference to FIG. 4A, the bulbous end 89 of the elongated rod 73 is fed through the gap 57 between coil windings 54 after having positioned the opposing end of the elongated rod 73 within the bottom retaining platform 80. As illustrated with reference again to FIG. 4B, the layers 68 and top support block 64 are positioned onto the coils 54. The top retaining platform 81 is positioned directly onto the top support block 64 while the elongated rod 73 is biased upward to hold the platform 80 in its place. With the top retaining platform 81 against the support block 64, there is sufficient room to insert the mating halves 92 into the bore 85 without interference from the biulbous end 89. Once the insert member 83 is in place, as illustrated with reference to FIG. 4C, a lifting tool is secured to within lifting notches 79 as illustrated with arrows in FIG. 4C. The top retaining platform 81 is then lifted away from the top support block 64, placing the elongated rod 73 under tension, and further biasing the bottom retaining platform 80 against the bottom coils 56. Shims 78 are then inserted between the top retaining platform 81 and the top support block 64, as illustrated with reference again to FIG. 4A.

The bulbous end 88 of the radial band formed as an elongated rod 72 and the elongated rod 73 having both of its ends formed in a bulbous shape, as described with reference to FIG. 4A, are formed using a glass ball 120 illustrated with reference now to FIGS. 9, 9A, and 10, by way of example.

The elongated rod 73 of the preferred embodiment of FIG. 4A is preferably formed using first and second glass balls 120, 121 carried within the opposing ends 122, 123 of a twisted fiberglass band 124 precured under tension for forming the rigid elongated fiberglass rod as described earlier as elongated rod 73, and as illustrated herein with reference to FIG. 10, by way of example. The elongated rod 73 is formed by wrapping a first band 126 a multiplicity of times for forming a continuous loop 128. Free ends of the loop 128 are tied as indicated by numerals 129 with reference again to FIG. 9. The first and second balls 120, 121 are positioned in a spaced relation within end portions of the loop 128. The first loop 128 is then twisted about an axis extending between the balls 120, 121 until the balls are fully engulfed within the band 126 and form a bulbous shape at each end as described earlier with reference to FIGS. 4A and 11. In a preferred embodiment, a second band 127 is formed and wrapped around the first loop 128 at right angle thereto for forming a second loop 130 and enclosing the balls 120, 121 therein, as illustrated with reference to FIG. 9A. The continuous bands 126, 128 having the balls 120, 121 therein are then twisted to form the elongated rod 73. In a preferred embodiment of the elongated rods 72, 73, the steps in forming the rod 72, 73 comprise providing a fiberglass tape impregnated and bonded with a resin, tensioning the twisted loops 126, 128, and curing the resin for forming a precured rigid elongated rod.

Preferably, the precured radial bands 72, 73 formed as the elongated rods, are made of conventional materials, such as a fiberglass material that is impregnated with a polyester, acrylic, or epoxy resin. The radial band 72, 73 is preferably formed in a fixture during a separate curing process which is performed outside of the generator. The preferred temperatures that are reached during the curing process range from 100 C. to about 160 C. depending upon the resin used. The time that these temperatures are maintained also depends upon the resin used. It is noted that lower temperatures will require a longer curing time while higher temperatures will require less time to cure the band. It is noted that the radial band 72 is cured or precured with the pin 76 in place prior to being installed in the coil windings.

One advantage of the present invention is that the precured radial band 72 and pin assembly, or the radial band 73 with two balls 120, 121 eliminates the curing of the banding in the winding. Another advantage is that the bulbous shaped head portion 88 on the radial band 72 enables a relatively quick and easy installation between the coils 54, 56.

In yet another embodiment of the present invention, and as illustrated with reference to FIG. 11, one elongated rod 132 includes a grooved rod end 134 with a groove 135 formed therein rather than a bulbous end as earlier described. In this embodiment, the connecting insert member 136 includes a bulge or flange 137 operating within the groove 135 to secure the rod within the connecting insert member, as illustrated with reference to FIG. 12. The connecting insert member 136 otherwise includes features as earlier described.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

That which is claimed is:

1. A method for clamping opposing pairs of stator coil windings of a turbine generator, the turbine generator having a first pair of coil windings positioned parallel and in a spaced relation forming a gap therebetween and a second pair of coil windings positioned parallel and in a spaced relation forming a gap therebetween, the second pair of coil windings opposing the first pair of coil windings and generally aligning the gaps thereof, the method comprising the steps of:

providing a fiberglass tape impregnated and bonded with a resin;

wrapping a portion of the fiberglass tape a multiplicity of times to form a first band into a first continuous loop;

wrapping another portion of the fiberglass tape a multiplicity of times to form a second band into a second continuous loop;

placing first and second balls in a spaced relation within the first continuous loop;

placing the first continuous loop including the balls therein within and at a right angle orientation to the second continuous loop, thus placing the first and second balls therein;

twisting the first and second loops about an axis extending between the balls;

continuing the twisting until the balls are fully engulfed within the bands for forming a bulbous shape at each end of an elongated rod;

tensioning the twisted loop;

curing the resin for forming a rigid elongated rod having bulbous shaped ends therein;

extending a support block onto and across the first pair of coil windings, the support block having an aperture therethrough;

aligning the aperture with the gap between the first pair of coil windings;

placing a first retaining platform onto the support block while extending the retaining platform across the first pair of coil windings, the retaining platform having a bore extending therethrough;

aligning the bore of the first retaining platform with the aperture of the support block and the gap between the first pair of coil windings;

extending a second retaining platform across the second pair of coil windings, wherein the first and second pairs of coil windings are sandwiched between the first and second retaining platforms, the second retaining platform having a bore extending therethrough;

aligning the bore of the second retaining platform with the gap between the second pair of coil windings;

inserting the elongated rod through the aperture, the bores of the first and second retaining platforms, and the gaps between the first and second pairs of coil windings;

providing first and second connecting insert members, each for carrying within each bore of the retaining platforms, each of the connecting insert members having a through-hole and each having separable mating segments for admitting therebetween, the elongated rod having bulbous shaped ends dimensioned for passing through each bore of the retaining platforms while the through-holes of the connecting insert members respectively prevent passage of the bulbous shaped ends therethrough;

inserting the first connecting insert member into the bore of the second retaining platform with each of the segments capturing the bulbous end at the second of the elongated rod extending therethrough, the elongated rod having a length sufficient for being secured within the second retaining platform while extending through the bore of the first retaining platform for securing the second connecting insert member to the bulbous end of the elongated rod;

securing the second connecting insert member into the bore of the first retaining platform;

lifting the first retaining platform for biasing the second retaining platform against the second pair of coil windings; and placing shims between the first retaining platform and the support block for providing a tension in the elongated rod for biasing the first and second retaining platforms against the first and second pairs of coil windings in a clamping arrangement thereof.

2. The method as recited in claim 1, wherein the lifting step comprises the step of inserting a lifting tool within notches carried within the first retaining platform.

3. The method as recited in claim 1, wherein the separable mating segments comprise two mating arcuate portions forming the through-hole, which segments are tapered for conforming to a tapered bore.

4. The method as recited in claim 1, wherein each of the through-holes of the connecting insert members includes a first dimension that allows passing of the bulbous ends therein and a second dimension preventing passage of the bulbous ends therethrough.

5. The method as recited in claim 1, further comprising the steps of:

providing at least one of the connecting insert members having a threaded bore therein; and threading the connecting insert member into the threaded bore of the retaining platform.

6. The method as recited in claim 1, wherein at least one of the connecting insert members has a tapered cross-section for adjustably securing within the bore of the retaining platform.

7. A method for clamping opposing pairs of stator coil windings of a turbine generator, the turbine generator having a first pair of coil windings positioned parallel and in a spaced relation forming a gap therebetween and a second pair of coil windings positioned parallel and in a spaced relation forming a gap therebetween, the second pair of coil windings opposing the first pair of coil windings for generally aligning the gaps thereof, the method comprising the steps of:

providing a rigid elongated rod having bulbous shaped ends therein;

placing a first retaining platform onto the surface of the first pair of coil windings and extending the first retaining platform thereacross, the first retaining platform having a bore extending therethrough;

aligning the bore of the first retaining platform with the gap between the first pair of coil windings;

extending a second retaining platform across the surface of the second pair of coil windings, wherein the first and second pairs of coil windings are sandwiched between the first and second retaining platforms, the second retaining platform having a bore extending therethrough;

aligning the bore of the second retaining platform with the gap between the second pair of coil windings;

inserting the elongated rod through the bores of the first and second retaining platforms, and the gaps between the first and second pairs of coil windings;

providing first and second connecting insert members, each for respectively carrying within each bore of the first and second retaining platforms, each of the connecting insert members having a through-hole and each having separable mating segments for admitting therebetween, the elongated rod having bulbous shaped ends dimensioned for passing through each bore of the retaining platforms while the through-holes of the connecting insert members respectively prevent passage of the bulbous shaped ends therethrough;

inserting the first connecting insert member into the bore of the second retaining platform with each of the segments capturing the bulbous end at one end of the elongated rod extending therethrough, the elongated rod having a length sufficient for being secured within the second retaining platform while extending through the bore of the first retaining platform for securing the second connecting insert member to the bulbous end of the opposing end of the elongated rod;

securing the second connecting insert member into the bore of the first retaining platform;

pulling against the first retaining platform for biasing the second retaining platform against the second pair of coil windings; and placing shims between the first retaining platform and the first pair of coil windings for providing a tension in the elongated rod for biasing te first and second retaining platforms against the first and second pairs of coil windings in a clamping arrangement thereof.

8. The method as recited in claim 7, further comprising the steps of:

extending a support block onto and across the surface of the first pair of coil windings, the support block having an aperture therethrough; and aligning the aperture with the gap between the first and pair of coil windings.

9. The method as recited in claim 7, wherein the lifting step comprises the step of inserting a pulling tool within notches carried within the first retaining platform.

10. The method as recited in claim 7, wherein the separable mating segments comprise two mating arcuate portions forming the through-hole, which segments are tapered for conforming to a tapered bore.

11. The method as recited in claim 7, wherein each of the through-holes of the connecting insert members includes a first dimension that allows passing of the bulbous ends therein and a second dimension preventing passage of the bulbous ends therethrough.

12. The method as recited in claim 7, further comprising of the steps of:

providing at least one of the connecting insert members having a treaded bore therein; and threading the connecting insert member into the threaded bore of the retaining platform.

13. The method as recited in claim 7, wherein at least one of the connecting insert members has a tapered cross-section for adjustably securing within the bore of the retaining platform.

* * * * *